July 7, 1959
R. T. MASSENGILL
2,893,051
APPARATUS FOR PREPARING HAMS
Filed Dec. 26, 1957
2 Sheets-Sheet 1
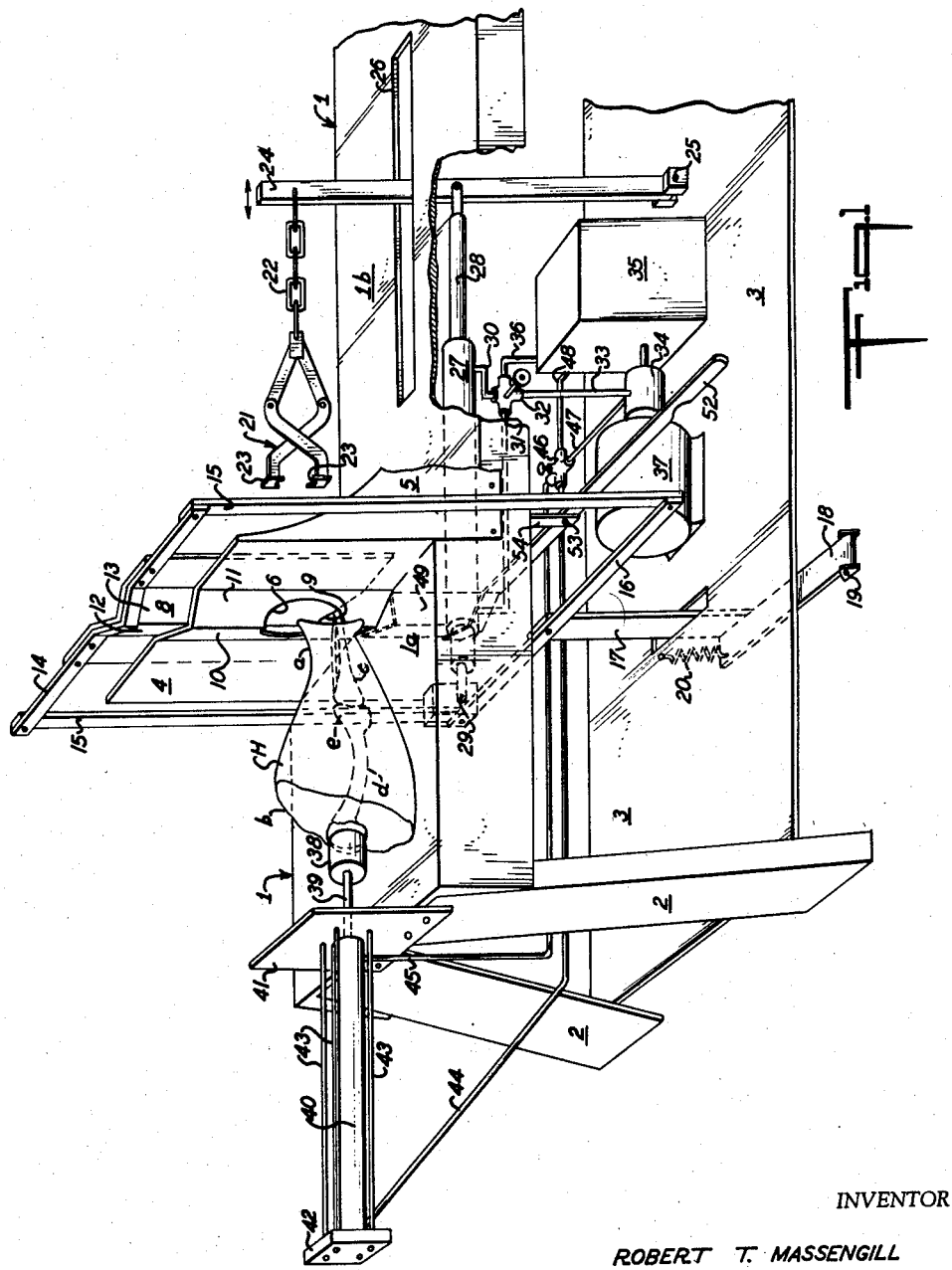
INVENTOR
ROBERT T. MASSENGILL
BY *Swecker + Mathis*
ATTORNEYS July 7, 1959
R. T. MASSENGILL
2,893,051
APPARATUS FOR PREPARING HAMS
Filed Dec. 26, 1957
2 Sheets-Sheet 2
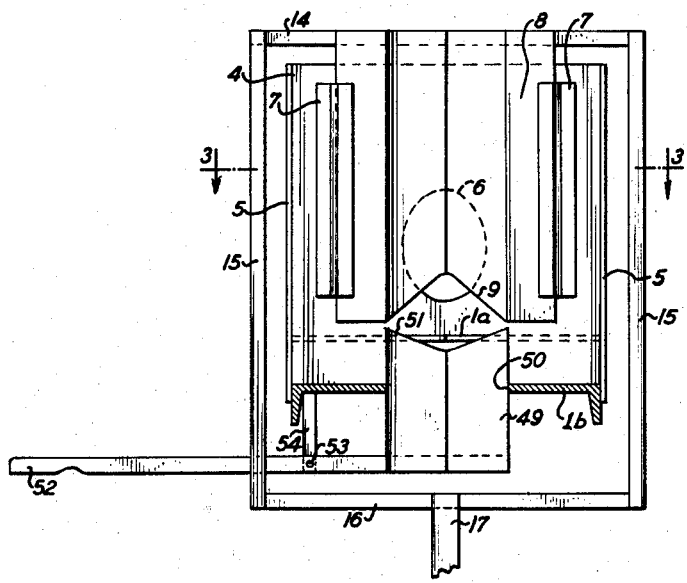
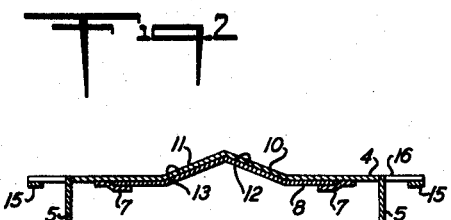
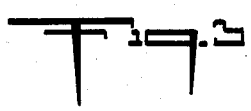
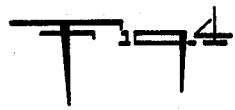
INVENTOR
ROBERT T. MASSENGILL
BY *Swecker + Mathis*
ATTORNEYS

United States Patent Office 2,893,051
Patented July 7, 1959

2,893,051
APPARATUS FOR PREPARING HAMS

Robert T. Massengill, Chicago, Ill.

Application December 26, 1957, Serial No. 705,365

11 Claims. (Cl. 17—1)

This invention relates to improvements in apparatus for preparing hams, and more particularly to improvements in apparatus for removing the bones from hams. This application is a continuation-in-part of my copending application, Serial No. 558,674, filed January 12, 1956, now Patent No. 2,857,619, granted October 28, 1958.

As explained in the aforesaid application, hams usually have been cured by applying a curing material to the outside surface of the ham, either by soaking, salting, or otherwise. However, this practice is subject to certain disadvantages. In order to obtain effective curing of the hams, long periods of time are required for complete penetration of the curing materials into the thick portions of the hams. Moreover, the bones which extend through the center of the hams are subject to attack, especially when the hams are not effectively cured throughout, and interfere with the complete curing process.

The presence of bones in the cured hams also results in certain disadvantages in the marketing and serving of the hams. These bones usually are waste products insofar as the consumer is concerned. Yet they constitute a substantial portion of the total volume of the hams so that the expense involved in shipping and handling the hams is unnecessarily high. In the serving of hams, the bones not only make the task of carving the meat more difficult but also make it impossible to remove all of the meat in the form of appetizing slices. Many small pieces or scraps of meat are left over from the usual carving operation, and these must be utilized in other types of dishes.

In some instances, butchers have occasionally boned a ham by the act of splitting the ham lengthwise down to the bone and cutting away the bone from the meat surrounding it, after which the meat of the ham is drawn together and tied with strings. However, this practice is not very satisfactory. It requires considerable skill on the part of the butcher, it is time consuming, and it results in an unsightly product because it leaves the finished ham with a ragged side.

The invention disclosed in my prior application identified above offers a means for overcoming the above objections and disadvantages. The apparatus disclosed therein functions to remove the bones from hams by a pulling action applied to the ends of the bones. This effectively removes the bone and leaves an opening extending through the interior of the ham, which opening may be packed with salt or other curing material to permit uniform curing of the ham and/or packed with stuffing materials prior to cooking to produce a desirable stuffed ham product.

The present invention is concerned with apparatus of this type. Its general object is to improve the construction of such apparatus so as to render it more effective in the removal of bones from hams and the like.

A more specific object of this invention is to provide improved apparatus for boning hams in which the force required for the removal of the bone from the ham will be substantially reduced.

Another object of this invention is to provide improved ham boning apparatus in which the meat is guided away from the bone of the ham during the withdrawal of the bone from the ham.

Yet another object of this invention is to provide improved ham boning apparatus in which the bone will be withdrawn from the ham and in which the tendency of the meat adjacent the joint between the two bone sections of the ham to move with the bone will be effectively overcome.

Another object of this invention is to provide improved apparatus for boning hams in which the tendency of the two major bone sections to separate during the extraction of the bone will be minimized.

These objects may be realized, according to a preferred embodiment of the invention, by the provision of apparatus which includes power means for pulling one end of a ham bone, power means for pushing the opposite end of the bone simultaneously with the pulling operation, means for holding the meat against movement with the bone and guiding it away from the bone as the bone is withdrawn from the ham, and means disposed adjacent such holding means for cutting the meat away from the joint between the two bone sections of the ham as this joint is withdrawn from the ham.

In this embodiment, the ham may be supported in a suitable manner with a bone projecting through an opening in a stationary abutment. A grab or clamp device may be attached to the end of the bone and moved away from the abutment so as to pull the bone through the opening in the abutment and out of the ham, the meat being restrained against movement with the bone by the abutment. The portion of the abutment which contacts the meat is V-shaped in a plane parallel to the direction of movement of the grab device and is arranged so that its sloping faces deflect the meat laterally away from the bone during the pulling operation. This guiding action of the abutment permits the bone to be separated cleanly from the meat and materially reduces the force required to remove the bone.

Simultaneously with the application of a pulling force upon one end of the bone by the grab device, the opposite end of the bone is subjected to a pushing action which also tends to move the bone through the opening in the stationary abutment. A power operated pusher device in position to engage the rear end of the bone and push it toward the abutment is employed for this purpose. When both pulling and pushing forces are applied to the bone, the stresses in the bone are minimized, and the bone sections are not separated from each other during the boning operation.

As the joint between the two bone sections of a ham is withdrawn from the meat, some meat tends to move with it. In order to prevent this, the preferred embodiment of the invention includes a cutter adjacent the abutment. When the joint emerges from the ham, the cutter may be actuated to cut the meat adjacent the joint and free it from the joint.

This embodiment of the invention is illustrated in the accompanying drawings, in which:

Fig. 1 is a perspective view of the ham boning apparatus;

Fig. 2 is a partial vertical cross section therethrough rearwardly of the ham-engaging abutment;

Fig. 3 is a detail horizontal cross section, with parts omitted, taken along the line 3—3 in Fig. 2; and Fig. 4 is a detail plan view of the knife illustrated in Fig. 1 and its actuating mechanism.

The invention is shown as applied to a conventional ham, generally indicated at H, which has a reduced hock end at *a* and a butt end *b* constituting the large fat area of the ham. These respective portions thereof have a main bone extending through the ham, with sections *c* and *d*, respectively, joined together at a knee joint *e*. A blade bone usually is attached at the free end of the bone section *d*, but this is of relatively small size and short, and very often it can be removed readily in preparing the ham for treatment.

While the invention is described in connection with a ham that is generally the hind quarter of a hog, it is also contemplated that it may be applied to the shoulder or forequarter of a hog or to similar parts of other animals, beef for example. Generally, however, it is more uniformly applicable to the conventional hams.

The apparatus illustrated in Figs. 1 to 4 comprises a bed 1 mounted on suitable supports or legs, generally indicated at 2 and located preferably at opposite ends of the bed 1. This bed 1 is of stepped configuration, as viewed in slide elevation, so as to provide a raised platform section 1*a* and a lower section 1*b*. The purpose of this configuration will become apparent hereinafter.

It is preferred that the legs 2 be of sufficient length so as to hold the platform section 1*a* of the bed 1 at a convenient height for the operator, such as at the elevation of the top of a conventional work table. The shelf 3 is shown as extending lengthwise between the legs 2 at opposite ends of the apparatus, not only for bracing the legs, but also for supporting some of the operating parts.

Mounted rigidly upon the bed 1 intermediate the length thereof, and preferably at the juncture of the sections 1*a* and 1*b*, is an upstanding plate or support 4. Braces 5 are connected with opposite ends of the support or plate 4 and with the opposite edges of the bed 1 to hold the plate securely in upstanding position on the bed. This plate or support 4 has a central opening 6 therein which may be open to the surface of the platform section 1*a* or spaced somewhat above the surface thereof, as shown in Fig. 2.

The plate or support 4 carries a pair of guides 7 transversely spaced on opposite sides of the opening 6. Slidably mounted between the guides 7 is a coacting plate or slide member 8 which has a notch or opening 9 in its lower end overlapping the opening 6 to receive a portion of the ham therebetween, such, for example, as one of the bone sections.

The members 4 and 8 cooperate to form an abutment against which an end of the ham H may bear during the bone-removing operation. In the construction disclosed in my prior application identified above, the corresponding abutment is flat and extends directly across the bed 1. It has been found in practice, however, that more effective operation can be obtained with an appreciable decrease in power consumption by shaping the abutment as illustrated in Figs. 1, 2 and 3.

From these views it will be evident that the central portions of both of the members 4 and 8 are V-shaped in horizontal cross section. The plate 4 includes two sloping faces 10 and 11 which converge at a line located approximately in the middle of the plate 4. The configuration of the member 8 conforms generally to that of the plate 4 in this respect; its central portion also includes two sloping faces 12 and 13 which converge toward the ham H.

The slide member 8 is adapted to be raised and lowered for increasing or reducing the size of the opening formed by the complementary portions 6 and 9. To provide for such raising and lowering movement, the upper end of the slide member 8 has a crossbar 14 secured thereto and extending transversely over the bed 1 spaced above the latter. At the opposite ends of the crossbar 14 and pivotally connected therewith are vertically extending links 15 that project downwardly on opposite sides of the platform, being connected together at their lower ends by a crossbar 16. The crossbar 16 is also pivotally connected with the links 15, whereby this structure provides for self-aligning of the movable plate or slide member 8 to assure of free action of the latter.

The crossbar 16 has a link 17 connected therewith intermediate its ends and extending downward to a foot pedal 18 with which it is pivotally connected. The foot pedal 18 may be suspended freely on the link 17 or pivotally mounted on the floor, as indicated at 19. A spring 20 should be connected between the pedal 18 and the shelf 3, to constitute suitable means for raising the sliding frame and movable plate 8, as desired.

A grab or clamp is indicated generally at 21, which preferably is of the type that applies increasing pressure as a pull is exerted thereon. In the form illustrated, this comprises a pair of crossed members connected at one end with a chain or other flexible device 22 and having fingers 23 on the opposite ends thereof, with concave inner faces or edges in position to embrace a ham bone. The grab or clamp 21 may be engaged with one end of the bone, and upon outward pulling action by the flexible device 22, will extract the bone from the ham.

This pulling action may be accomplished by a lever 24 connected with one end of the flexible device 22. The opposite end of the lever 24 is pivotally supported at 25 in a suitable position for swinging movement through a slot 26 in the lower section 1*b* of the bed 1.

Intermediate the length of the lever 24, it is connected with a power device for manipulating the lever. This power device comprises a hydraulic cylinder, generally designated at 27, and having a piston rod 28 connected with a piston therein and with the lever 24 intermediate the length of the latter. The cylinder 27 is pivotally supported at its opposite end at 29 on the under side of the bed 1.

The hydraulic power device should preferably be of the double-acting type, with connections 30 and 31 extending to the opposite ends thereof from a suitable 4-way valve 32 adapted to be controlled by the operator for obtaining the proper and desired operation of the device.

The valve 32 has a connection 33 with a pump 34 connected at one side of a tank 35, which tank also has a return bypass 36 from the valve 32. The pump 34 may be operated by an electric motor 37 or other suitable power means.

The illustrated embodiment of the invention also includes means for pushing the rear end of the bone of the ham while the front end of the bone is being pulled by the grab device 21. This means includes a pusher 38 shaped to engage the end of the bone section *d* and means for reciprocating the pusher 38.

The pusher 38 is fixed to the end of a piston rod 39 driven by a hydraulic cylinder 40 secured to an upstanding bracket 41 carried by the bed 1 of the machine. In order to enhance the stability of the cylinder 40, it preferably is supported also at its rear end, as by a plate or block 42 fixed to the bracket 41 by tie rods 43 or the like.

The means for operating the cylinder 40 may be similar to that described above in connection with the cylinder 27 for driving the grab device 21. It is preferred that the cylinder 40 be double-acting, with connections 44 and 45 extending to the opposite ends thereof from a suitable 4-way valve 46 adapted to be controlled by the operator. The valve 46 is connected to the pump 34 by a line 47 and is connected to the tank 35 by a by-pass 48.

The illustrated apparatus also includes a knife 49 disposed below the slide member 8 of the ham-restraining abutment and mounted for vertical movement through a slot 50 in the section 1*b* of the bed 1. As indicated clearly in Fig. 4, the knife 49 may conform in shape to the V-shaped central portion of the slide member 8. Its upper cutting edge 51 preferably is concave, as illustrated in Fig. 2.

The lower portion of the knife 49 is welded or otherwise fixed to the end of an elongated lever 52 pivoted at 53 to a bracket 54 rigid with and depending from the bed 1. The weight of the knife 49 is sufficient to hold it normally in a depressed position, but the knife 49 may be moved upwardly by depressing the outer end of the lever 52 when desired to cut any meat that may be attached to the lower surface of the bone being withdrawn from the ham through the opening 6 in the plate 4. It has been found that this cutting action is particularly desirable at the time when the knee joint $e$ between the two bone sections $c$ and $d$ emerges from the ham H.

In the operation of the illustrated apparatus, the ham H is placed on the section 1a of the bed 1 with the hock end $a$ thereof toward the opening 6. The blade or hitch bone that is often attached to the main bone $d$ may be removed by the operator in preparing the ham for treatment, and the bone $c$ should be projected through the openings 6 and 9 sufficiently to permit engagement of opposite sides of the bone $c$ by the fingers 23 on the grab or clamp 21. Similarly, the bone $d$ is positioned for engagement by the pusher 38.

Then, upon operation of the hydraulic power device 27 by proper control of the valve 32, the lever 24 will swing to the right in Fig. 1 to apply a pulling action to the grab or clamp 21 acting on the bone $c$. The gripping force of the clamp 21 on the bone will increase as the pull increases, so as to eliminate any possibility of disengagement of the clamp from the bone. The meat or body of the ham H will be held back by the abutment formed by members 4 and 8, and the bone of the ham will be withdrawn through the aligned openings 6 and 9 by the action of the clamp 21.

The V-shaped central portion of the abutment plays an important role in the separation of the meat from the bone. It is contemplated that initially the meat will contact the abutment along the lines of convergence of the sloping faces 10 and 11 of member 4 and the sloping faces 12 and 13 of member 8. However, the meat is deformable to some extent, and as the pulling force exerted by the clamp 21 increases, the meat will move forwardly along the sloping faces 10, 11, 12 and 13 and will be deflected laterally away from the bone. This pushing action aids materially in freeing the meat from the bone. It not only reduces the power required to remove the bone, but also reduces the number of meat particles which are withdrawn along with the bone.

Normally, the entire length of bone comprising both sections $c$ and $d$ may be withdrawn readily from the body of the ham by the action of the clamp 21. However, there is some tendency for the bone sections $c$ and $d$ to separate within the body of the ham H when the bone is subjected to the pull of the grab device 21. This tendency may be overcome effectively, according to the present invention, by driving the pusher 38 forwardly so as to exert force upon the bone section $d$ while the bone section $c$ is being pulled by the grab device 21. The necessary movements of the pusher 38 for this purpose may be effected easily by suitably controlling the hydraulic cylinder 40 through manipulations of the control valve 46.

It has been found that in practice it is particularly difficult to separate the knee joint $e$ of the bone from the ham H. In the area of the joint $e$ the meat is intimately associated with the bone, and strong, tough tendons extend across the outside of the knee joint $e$ to connect the bone sections $c$ and $d$ to muscles adjacent the joint. As a result, that portion of the body of the ham H in the vicinity of the knee joint tends to move with the bone during the pulling operation.

This undesirable tendency is overcome according to the present invention by actuating the lever 52 to move the knife 49 upwardly as the joint $e$ is pulled through the openings 6 and 9. Since the ham H is placed upon the platform 1a with the outside of the knee joint $e$ facing downwardly, the knife 49 severs the tough tendons extending across the outside of the knee joint as it moves upwardly. The knife 49 also cuts the meat away from the bottom of the joint and frees the bone for further movement relative to the meat.

The stepped configuration of the bed 1 of the machine provides a substantial clearance between the lower section 1b of the bed 1 and the level of the openings 6 and 9 in the abutment. This clearance not only provides additional space for the manipulation of the grab device 21 but also facilitates the controlling of the knife 49.

Although the bone may be removed from a cured ham if desired, it is normally preferred that the removal of the bone be accomplished before the ham is cured. This permits the ham to be treated more readily, both for preserving and for palatability purposes.

A preservative may be applied both externally and internally of the ham in the usual manner of applying salt, brine, or other suitable treating materials. For example, the inside of the ham may be packed with curing salt so as to effect a curing treatment from the inside out, and the exterior of the ham may have salt applied thereto so as to effect a curing treatment from the outside in. This effects a complete curing of the ham more quickly and more effectively than is possible when the ham is treated with the bone in place. Moreover, it completely eliminates a possibility of attack by insects, as often happens when the ham is ineffectively cured with the bone in place.

The effective removal of the bone results in a new ham product which also is adaptable for use in new methods of preparation. For example, the open cavity in the ham, left by the removal of the bone, may be filled with foodstuffs to provide a desirable stuffed ham, while leaving the entire outer surface thereof free of blemishes and without any tying or confining in the manner of conventional boned hams.

Although a specific embodiment of the invention has been illustrated and described in detail, variations and modifications thereof will be apparent to persons skilled in the art. It is intended therefore that the foregoing description be considered as exemplary only, and that the scope of this invention be ascertained from the following claims.

I claim:

1. Ham treating apparatus comprising a frame, means on said frame for supporting a ham with the bone of the ham exposed at one end of the ham, a fixed abutment on said frame adjacent said supporting means and having an opening therein of such size that the exposed end of said bone may be projected through said opening and the body of the ham may not pass through said opening, a grab device on one side of said abutment in position to engage the exposed end of said bone when said bone is projected through said opening in said abutment, means connected to said grab device for moving said grab device away from said abutment to extract the bone from the body of the ham, a pusher movably mounted on said frame on the opposite side of said abutment in position to engage to opposite end of the bone, and means connected to said pusher for moving said pusher toward said abutment to push against the bone as the bone is being pulled by said grab device so as to prevent separation of the bone sections.

2. In ham treating apparatus having a frame, means on said frame for supporting a ham with the bone of the ham exposed at one end of the ham, a grab device mounted on said frame in position to engage the bone, and means connected to said grab device for moving the grab device in a direction away from the ham supporting means to extract the bone from the ham, the improvement which comprises an abutment on said frame adjacent said supporting means having a ham-engaging face portion extending at an acute angle to the direction of movement of said grab device and having an opening in said ham-engaging portion through which the end of the bone may be projected.

3. Ham treating apparatus comprising means for supporting a ham with the bone of the ham exposed at one end of the ham, a fixed abutment adjacent said supporting means and having an opening therein of such size that the exposed end of said bone may be projected through said opening and the body of the ham may not pass through said opening, a grab device on one side of said abutment in position to engage the exposed end of said bone when said bone is projected through said opening in said abutment, and means connected to said grab device for moving said grab device away from said abutment to extract the bone from the body of the ham, said abutment including a ham-engaging face portion adjacent said opening therein disposed at an acute angle to the direction of movement of said grab device for deflecting the meat of the ham away from the bone of the ham during movement of said grab device.

4. Ham treating apparatus comprising means for supporting a ham with the bone of the ham exposed at one end of the ham, a fixed abutment adjacent said supporting means having an opening therein of such size that the exposed end of said bone may be projected through said opening and the body of the ham may not pass through said opening, a grab device on one side of said abutment in position to engage the exposed end of said bone when said bone is projected through said opening in said abutment, and means connected to said grab device for moving said grab device away from said abutment to extract the bone from the body of the ham, said abutment including a V-shaped ham-engaging face portion adjacent said opening therein and directed away from said grab device so that the sloping sides of said V-shaped ham-engaging face portion deflect the meat of the ham laterally away from the bone in opposite directions during movement of said grab device.

5. Ham treating apparatus comprising a frame, means on said frame for supporting a ham with the bone of the ham exposed at one end of the ham, an upstanding plate on said frame adjacent an end of said supporting means having an opening therein through which the exposed end of said bone may be projected and having a V-shaped ham-engaging face portion directed toward said supporting means, means slidably mounted with respect to said plate and cooperating therewith to prevent passage of the body of the ham through said opening, a grab device on the side of said plate opposite said supporting means in position to engage the exposed end of said bone when said bone is projected through said opening in said plate, and means connected to said grab device for moving said grab device away from said plate, whereby said grab device pulls the bone out of the body of the ham and said V-shaped ham-engaging face portion of said plate deflects the meat of the ham laterally away from the bone.

6. Ham treating apparatus comprising a frame, an upright plate mounted on said frame and having a V-shaped central portion wth an opening therein, guide means on said plate, a movable plate slidably mounted in the guide means for raising and lowering movement with respect to the frame and having a V-shaped central portion in face-to-face contact with said central portion of said upright plate, said central portion of said movable plate having an opening therein in position to coact with the opening in said upright plate to permit passage of the bone of the ham therethrough but to prevent passage of the body of the ham therethrough, a platform mounted on the frame on the side of said plates toward which said V-shaped portions of said plates are directed and in position to receive the ham in prone position, means operatively connected with the movable plate for raising and lowering the latter with respect to the frame, a grab device on the opposite side of the plates from the platform, and means connected with the grab device for moving the latter outward away from the platform to extract the bone from the body of the ham.

7. Ham treating apparatus comprising means for supporting a ham with a bone of the ham exposed at one end of the ham, an abutment adjacent said supporting means having an opening therein of such size that the exposed end of said bone may be projected through said opening and the body of the ham may not pass through said opening, a knife mounted for movement along a path adjacent said abutment, a grab device in position to engage the exposed end of said bone when said bone is projected through said opening in said abutment, means connected to said grab device for moving said grab device away from said abutment to withdraw the bone from the body of the ham, and means connected to said knife for moving said knife toward the bone as the bone is being withdrawn from the body of the ham to cut meat from the bone.

8. Ham treating apparatus comprising a bed having a slot therein, means on said bed for supporting a ham with the bone of the ham exposed at one end of the ham, an upright plate mounted on said bed adjacent said slot and having an opening therein, guide means on said plate, a movable plate slidably mounted in said guide means for raising and lowering movements with respect to the bed and having an opening therein in position to coact with the first mentioned plate for projecting a ham bone therethrough, said movable plate being adapted to contact the upper surface of said ham bone when the bone is projected through said openings, means operatively connected with said movable plate for raising and lowering said movable plate with respect to said bed, a knife mounted on said bed for movement through said slot, means operatively connected with said knife for raising and lowering said knife with respect to said bed, a grab device on the side of said plates opposite from said ham supporting means, and means connected with the grab device for moving the latter outward away from said plates to extract the bone from the body of the ham.

9. Ham treating apparatus comprising a bed having a slot therein, means on said bed for supporting a ham with the bone of the ham exposed at one end of the ham, an upright plate mounted on said bed adjacent said slot and having an opening therein, guide means on said plate, a movable plate slidably mounted in said guide means for raising and lowering movements with respect to the bed and having an opening therein in position to coact with the first-mentioned plate for projecting a ham bone therethrough, said movable plate being adapted to contact the upper surface of said ham bone when the bone is projected through said openings, means operatively connected with said movable plate for raising and lowering said movable plate with respect to said bed, a knife mounted on said bed for movement through said slot, means operatively connected with said knife for raising and lowering said knife with respect to said bed, a grab device on the side of said plates opposite from said ham supporting means, means connected with the grab device for moving the latter outward away from said plates to extract the bone from the body of the ham, a pusher movably mounted on said bed on the side of said plate opposite said grab device in position to engage the opposite end of the bone, and means connected to said pusher for moving said pusher toward said plates to push against the bone as the bone is being pulled by the grab device.

10. Ham treating apparatus comprising a bed having a slot therein, an upright plate mounted on said bed adjacent said slot and having a V-shaped central portion with an opening therein, guide means on said plate, a movable plate slidably mounted in said guide means for raising and lowering movements with respect to said bed and having a V-shaped central portion in face-to-face contact with said central portion of said upright plate, said central portion of said movable plate having an opening therein in position to coact with the opening in said upright plate to permit passage of the bone of the ham therethrough but to prevent passage of the body of the ham therethrough, said bed including a platform on the side of said plates toward which said V-shaped portions are directed and in position to receive the ham in prone position, means operatively connected with the movable plate for raising and lowering the latter with respect to the bed, a grab device on the opposite side of the plates from the platform, means connected with said grab device for moving the latter outward away from the platform to extract the bone from the body of the ham, a knife mounted on said bed for movement through said slot, and means operatively connected to said knife for moving said knife upwardly as the bone is being withdrawn from the body of the ham to cut meat from the bone.

11. Ham treating apparatus comprising a bed having a V-shaped slot therein, an upright plate mounted on said bed adjacent said slot and having a V-shaped central portion with an opening therein, guide means on said plate, a movable plate slidably mounted in said guide means for raising and lowering movements with respect to said bed and having a V-shaped central portion in face-to-face contact with said central portion of said upright plate and disposed above said slot, said central portion of said movable plate having an opening therein in position to coact with the opening in said upright plate to permit passage of the bone of the ham therethrough but to prevent passage of the body of the ham therethrough, said bed including a platform on the side of said plates toward which said V-shaped portions are directed and in position to receive the ham in prone position, means operatively connected with the movable plate for raising and lowering the latter with respect to the bed, a grab device on the opposite side of the plates from the platform, means connected with said grab device for moving the latter outward away from the platform to extract the bone from the body of the ham, a V-shaped knife mounted on said bed for movement through said slot, and means operatively connected to said knife for moving said knife upwardly as the bone is being withdrawn from the body of the ham to cut meat from the bone.

References Cited in the file of this patent

UNITED STATES PATENTS

| | | |
|---|---|---|
| 1,435,877 | Reubold | Nov. 14, 1922 |
| 1,975,044 | Kelly | Sept. 25, 1934 |
| 2,493,707 | Weber | Jan. 3, 1950 |
| 2,587,967 | Coad | Mar. 4, 1952 |